United States Patent [19]
Fung

[11] Patent Number: 5,486,367
[45] Date of Patent: Jan. 23, 1996

[54] ENZYMATIC METHOD FOR ACCELERATING FERMENTATION OF COMESTIBLE PRODUCTS

[75] Inventor: Daniel Y. C. Fung, Manhattan, Kans.

[73] Assignee: Kansas State University Research Foundation, Manhattan, Kans.

[21] Appl. No.: 230,430

[22] Filed: Apr. 19, 1994

Related U.S. Application Data

[63] Continuation of Ser. No. 959,744, Oct. 13, 1992, abandoned.

[51] Int. Cl.$^6$ .............................. A23B 4/20; A23L 1/105; A21D 2/00
[52] U.S. Cl. ................... 426/7; 426/8; 426/9; 426/10; 426/11; 426/15; 426/16; 426/18; 426/29; 426/32; 426/33; 426/34; 426/55; 426/57; 426/62
[58] Field of Search ................. 426/7, 8, 9, 10, 426/11, 15, 16, 29, 18, 32, 33, 34, 55, 57, 62

[56] References Cited

U.S. PATENT DOCUMENTS 4,996,073  2/1991  Copeland et al. .................. 426/487

OTHER PUBLICATIONS

Fung, Fung's Applied Food Microbiology, Encyclopedia of Food Science and Technology, 1992.
Adler et al.; Journal of Bacteriology, Aug. 1981, pp. 326–332.
Adler, The Use of Microbial Membranes to Achieve Anaerobiosis; Revised Aug. 23, 1989 Beuachat, Food and Beverage Mycology, p. 202.
Buege, et al.; Manufacturing Summer Sausage; Apr. 1980 PCT Publication; WO 92/06214.
Yu et al., Journal of Food Safety, (1991) 11 (3) 149–162 (Abstract Only).
Yu et al., Journal of Food Safety, (1991) 11 (3) 163–175 (Abstract Only).

Primary Examiner—Helen Pratt
Attorney, Agent, or Firm—Hovey, Williams, Timmons & Collins

[57] ABSTRACT

An improved, short-time process for fermentation of comestible products is described which enhances the growth of operative microorganisms in a fermentation system and consequently reduces the required incubation time. The process involves inoculating a given fermentation system containing a starting food ingredient substrate and fermentative microorganism(s) with an amount of an oxygen-reactive enzyme such as OXYRASE™ (a trademark of Oxyrase, Inc. of Akron, Ohio) which is not naturally generated by virtue of said fermentation process. Reduced time fermentation can be achieved in a wide variety of systems, such as in the production of fermented liquid, semisolid and solid dairy products, fermented meat products, fermented cereal-based products, yeast-raised baked and fried products, and alcoholic beverages.

10 Claims, 4 Drawing Sheets

ENZYMATIC METHOD FOR ACCELERATING FERMENTATION OF COMESTIBLE PRODUCTS

This application is a continuation of application Ser. No. 07/959,744, filed Oct., 13, 1992, now abandoned.

BACKGROUND OF THE INVENTION

1. Field of the Invention

The present invention is broadly concerned with an improved fermentation process wherein the time required to complete fermentation of food ingredient substrates to produce a comestible product is materially reduced. More particularly, the invention is concerned with a fermentation method which is improved by the addition of an oxygen-reactive enzyme into a fermentation system, which added enzyme is not naturally generated by virtue of the fermentation process, so as to accelerate the activity of fermentative microorganism(s) present therein. The invention is applicable to virtually any fermentation system, such as those used in the production of fermented liquid, semisolid and solid dairy products (e.g., milks, yogurts and cheeses), fermented meat, cereal-based, yeast-raised products and alcoholic beverages.

2. Description of the Prior Art

Food fermentation is a result of microbial activity, usually anaerobic, on suitable substrates under controlled or uncontrolled conditions resulting in the production of desirable foods or beverages that are characteristically more stable, palatable, and/or nutritious than the starting food ingredient substrates. Generally speaking, starting food ingredient substrates are inoculated with microorganism(s) and are incubated under regulated conditions of time, temperature and pH. Fermentation can be a single-culture process wherein only a single type of microorganism is employed, such as in wine, beer and bread-making, single-culture fermented dairy products, and vinegar production. Alternately, mixed culture (either pure or naturally occurring) fermentation is also widely practiced and generally involves a controlled mixture of bacteria or bacteria with a combination of yeast and mold. A common example of such processes is the production of yogurt and many types of cheeses.

The history of food fermentation has generally paralleled developments in microbiology and food microbiology. Traditionally, many foods were prepared by fermentation, but the reasons behind success or failure of the processes were not known. After Pasteur demonstrated that a specific microorganism (e.g., yeast) acting on a suitable substrate (grape juice) will produce a desirable product (wine), the science of food fermentation began. Now many food fermentation principles and practices are well established and food processors can predictably produce consistently good-quality fermented products.

The principal fermentation reactions in foods can be classed as those involving production of lactic, propionic, citric, butyric or acetic acids, as well as alcoholic and gassy fermentations. As might be expected, many fermentation systems are highly specific in terms of the microorganisms employed as well as in culturing conditions.

In many commercial fermentation operations, incubation time is the most critical determinant of overall production schedules. To give but one example, the fermentation of yogurt typically involves an incubation time on the order of 5 hours. If this time could be materially reduced, it would represent a significant financial advantage to the yogurt processor, both in terms of actual processing time and in requirements for mixing and holding equipment. Similarly, incubation time reductions would be similarly important in a vast array of commercial fermentation operations.

SUMMARY OF THE INVENTION

The present invention overcomes the problems outlined above, and provides a significantly improved fermentation process offering a means for substantially reducing incubation times while still producing high quality end products.

Broadly speaking, the process of the invention is designed for the production of comestible food or beverage products wherein a starting food ingredient substrate is inoculated with a fermentative microorganism and the inoculated substrate is then incubated in order to cause the microorganism to undergo fermentative activity in the presence of the food ingredients in order to yield the desired product. Importantly, at least a portion of the fermentative activity of the microorganism is carried out in the presence of an oxygen-reactive enzyme which is not naturally generated by virtue of said fermentation process, in order to increase the fermentative activity of the microorganism, and correspondingly decrease the incubation time. Such time reductions should preferably be at least about 10%, as compared with the incubation time of an otherwise identical inoculated food ingredient system free of the added enzyme.

The most preferred oxygen-reactive enzyme is OXYRASE™ (a trademark of Oxyrase, Inc. of Ashland, Ohio) enzyme, known to be an effective oxygen-reducing enzyme used to produce anaerobic conditions. The OXYRASE™ (a trademark of Oxyrase, Inc. of Ashland, Ohio) enzyme is described in a technical bulletin "Properties of the Oxyrase Enzyme System Used to Isolate and Cultivate Anaerobic Microorganisms", distributed by Oxyrase, Inc. of Ashland, Ohio. Moreover, the enzyme system is further described by Adler et al. in *J. Bacteriology*, August, 1981, p. 326–332. The properties of the OXYRASE™ enzyme are also described in PCT Publication No. WO 92/06214 published Apr. 16, 1992. All of the foregoing are incorporated by reference herein.

The amount of oxygen-reactive enzyme to be used in a given system is variable, depending upon the amount of microorganism present and its activity and growth characteristics in the fermentation system. Generally speaking, it has been found that the added enzyme should be present from a level of about 0.1–0.3 units of enzyme per ml of substrate (i.e., the starting food system ingredients) present.

The types of starting food ingredient substrates can be varied widely, and as examples can be selected from the group consisting of ingredients used for the production of fermented liquid, semisolid and solid dairy products, typically for the production of buttermilk, sour cream, acidophilus milk, sweet acidophilus milk, bulgaris milk, yogurt, kefir, koumiss, and cheeses such as american, bleu, brick, cheddar, colby, cottage, cream, edam, gouda, limburger, parmesan, roquefort, swiss and processed cheeses; ingredients to produce fermented meat products such as sausages of all kinds; ingredients to produce cereal-based foods including bread, rolls, pastries, crackers, doughnuts and pretzels; and ingredients to produce alcoholic beverages, the most common being beer, wine and distilled fermented alcoholic products.

Virtually all types of fermentative microorganisms can be employed in the context of the invention, typically those taken from the group consisting of bacteria, yeast and molds.

More specifically, such microorganisms can consist of bacteria from the genera Acetobacter, Streptococcus, Leuconostoc, Pediococcus, Lactobacillus, Propionibacterium, yeast from the genera Saccharomyces, Candida, and Torula, and mold from the genera Aspergillus, Penicillium, Rhizopus, and Mucor.

DESCRIPTION OF THE PREFERRED EMBODIMENT

The following examples are presented by way of illustration, and it should be understood that nothing therein should be taken as a limitation upon the overall scope of the invention. Throughout these examples, reference is made to the use of OXYRASE™ enzyme. In each case, use of the enzyme refers to use of a sterile suspension of membrane fragments produced from *E. coli* and designed for anaerobic cultivation of bacteria. This suspension was purchased from Oxyrase, Inc. of Ashland, Ohio. The suspension (0.1 units enzyme/ml) was placed in 2 ml tubes and frozen for use. Before each test, the oxygen-reducing membrane fragments were thawed in a refrigerator for approximately 12 hours.

EXAMPLE 1

In this example, the fermentative activity of yeast in bread making was tested using a standard control bread dough formula, and with the same dough formula supplemented with OXYRASE™ enzyme. The presence of OXYRASE™ stimulated the growth of yeast and consequently the amount of carbon dioxide produced by the yeast and trapped in the dough matrix; this effect was measured by dough volume increases over time.

The comparative bread dough formulations were prepared as follows. Dried yeast (1.5 g) was first dissolved in 20 ml of lukewarm distilled water, and then mixed with 80 ml of ambient temperature water. 0.5 g NaCl (Fischer Scientific, Fair Lawn, N.J.) was added to the water. Hard wheat flour (150 g) obtained from Kansas State University, Department of Grain Science, Manhattan, Kans., was added to the yeast/salt solution. Dextrose was then added at a level of 1% baker's weight (i.e., 1% based upon the amount of wheat flour taken as 100%). The dough mixture was then kneaded well in a 500 ml beaker using a clean glass rod and split into equal portions. Two ml (0.2 units) of OXYRASE™ enzyme suspension were added to one dough portion at this stage and the enzyme suspension was kneaded into the dough portions. The no-OXYRASE™ control dough portions and the OXYRASE™ suspension-added dough portions were then divided into respective 25 g portions and placed in previously oiled and drained 100 ml glass cylinders. The cylinders were tapped against a soft surface to remove gas bubbles and incubated at 25° and 32° C. The dough volume of each flask was measured at 15 minute intervals until a maximum volume was obtained. The difference between the initial volume and the volume of the sponge at respective times were plotted, and these results are shown in FIG. 1.

Figure 1:
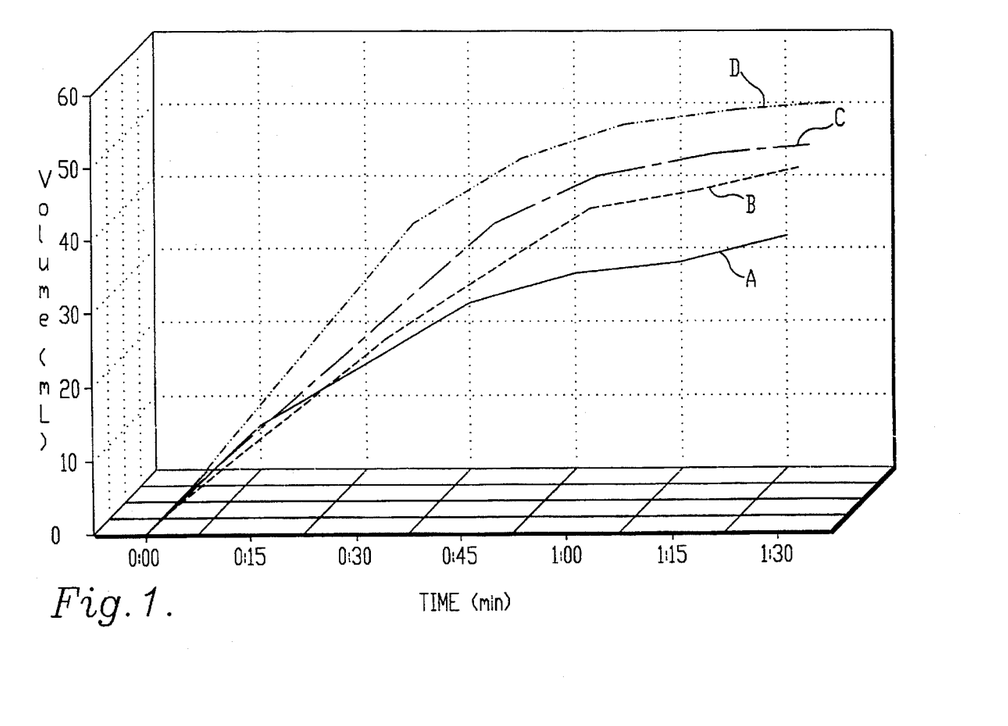
FIG. 1 is a graph setting forth comparative fermentation results obtained using conventional bread dough versus otherwise identical bread dough supplemented with an oxygen-reactive enzyme in accordance with the invention.

Referring to FIG. 1, the volume results for the standard dough incubated at 25° C. is plotted as line A. The comparative OXYRASE™-supplemented dough incubated at this same temperature is plotted as line B. Line C sets forth the volume results for the conventional dough incubated at 32° C., whereas line D is a similar plot for the OXYRASE™-containing dough incubated at 32° C. As is readily apparent, the presence of OXYRASE™ in the doughs enhanced the fermentative activity and consequent volume of carbon dioxide generated. This demonstrates that the time required for bread making can be significantly reduced by inclusion of OXYRASE™ enzyme in bread dough.

EXAMPLE 2

In this test, the effect of OXYRASE™ enzyme on the growth of *Lactobacillus bulgaricus* and *Streptococcus thermophilus* was determined.

Test Cultures

The test cultures were obtained from Kansas State University Food Microbiology Collection, which were maintained on lactobacilli MRS (deMan et al. 1960; *J. App. Bacteriology* 23:13; commercialized by Difco, Inc. of Detroit, Mich.) agar slants at 4° C. after 24 hours incubation at 37° C. Before and after the test, gram staining was performed for each culture. S. thermophilus exhibited gram-positive cocci, whereas *L. bulgaricus* exhibited gram-positive rods. Before the tests, one loop of each culture was transferred from the stock culture slant to 10 ml of MRS broth and incubated at 37° C. for 24 hours. In order to control initial population, propagated culture in MRS broth was serially diluted with sterile phosphate buffer ($10^{-2}$, $10^{-3}$, $10^{-4}$ dilutions) and enumerated with the spiral plating method of Manninen et al., 1991, Spiral System and Laser Counter for Enumerations of Microorganism; *J. Food Safety* 11:177–187. The initial cell populations were approximately $10^{-2}$–$10^{-3}$ CFU/ml. A Model D spiral plater (Spiral System Instruments, Inc., Bethesda, Md.) was used for plating.

Media Preparation

Lactobacilli MRS broth (Difco, Inc.) and agar (lactobacilli MRS broth plus 1.5% Bacto Agar (Difco, Inc.)) were respectively used to enrich and enumerate each culture. The ingredients of dehydrated Bacto Lactobacilli MRS broth per liter was as follows:

| | |
|---|---|
| Bactoproteose peptone No. 3 | 10 g |
| Bacto Beef Extract | 10 g |
| Bacto Yeast Extract | 5 g |
| Dextrose | 20 g |
| Sorbitan Monooleate Complex | 1 g |
| Anmonium Citrate | 2 g |

| | |
|---|---|
| Sodium Acetate | 5 g |
| Magnesium Sulfate | 0.1 g |
| Manganese Sulfate | 0.05 g |
| Disodium Phosphate | 2 g |

The sterilized Lactobacilli MRS broth (90 ml) was prepared in Klett flasks for each sample. Agar plates with 20 ml of sterile MRS Bacto Agar were prepared and kept in a refrigerator before use in surface plating. For the serial dilution, sterile phosphate buffered water was prepared in 9 ml tubes and 99 ml bottles.

Growth studies one ml of each population-controlled culture solution was added to each of 9 sterile Klett flasks each of which contained 90 ml of MRS broth with or without the addition of OXYRASE™ enzyme suspension at a level of 0.1 unit/ml. The flasks were incubated at 37° C. in a water bath. Viable cell numbers and turbidity of each culture in MRS broth were determined immediately after inoculation and at 1, 2, 3, 4, 6, 8, 10, 12, 14, 16, 18, 22, 26, 30, 34, 38 and 46 hours. Turbidity was measured directly from the side arms of the Klett flasks. One ml of sample was obtained from each flask and appropriate dilutions were made to perform viable cell counts. All platings were duplicated, and all plates were inverted and incubated at 37° C. for 48 hours before cell enumeration. Spiral plates were counted manually with a Model MV Colony Viewer (Spiral System Instruments, Inc.). At the beginning and end of each test, the pH values of the samples were measured. All tests were replicated three times for each sample.

Growth curves were constructed using the average cell number of replicated samples. Growth rate ($\mu$) and generation time (g) were calculated by using two values from the logarithmic phase of the growth curves according to the formulae:

$$\mu = 1.303(\log N_2 - \log N_1)/(T_2 - T_1)$$

$$g = 0.693/\mu$$

where N and T denote cell population (CFU/ml) and time (hr), respectively. The duration of lag phase for each treatment was defined as the time for the initial population density to increase twofold (Buchanan et al., 1990; A Mathematical Approach Toward Defining and Calculating the Duration of the Lag Phase; *Food Microbiology*, 7:237-240) and calculated by interpolating from hourly measurements.

Figure 2:
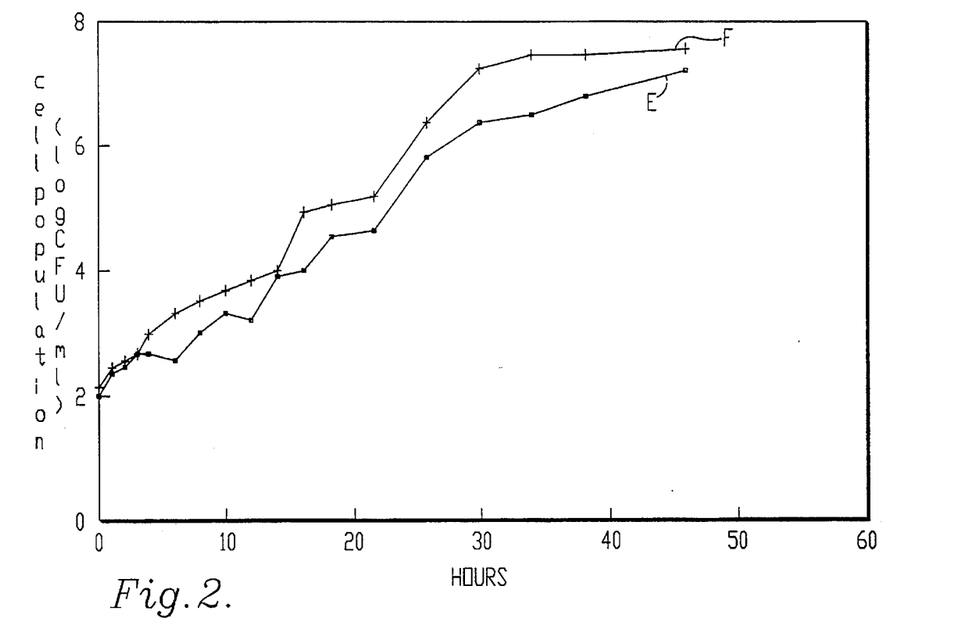
FIG. 2 is a graph illustrating comparative growth results with *L. bulgaricus* with and without the presence of an oxygen-reactive enzyme.
Figure 3:
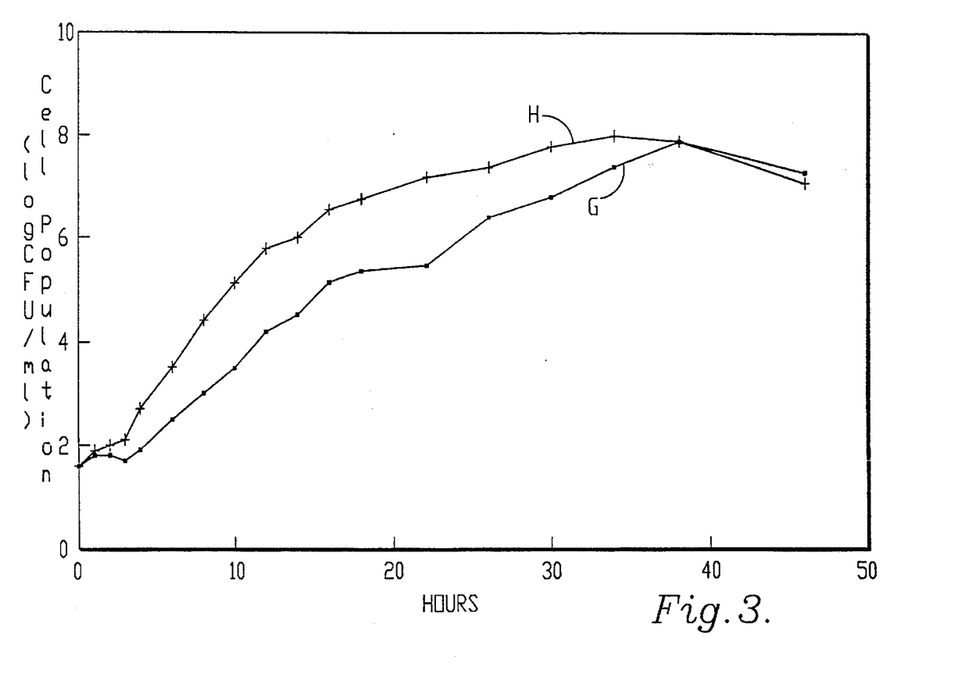
FIG. 3 is a graph illustrating comparative growth results with *S. thermophilus* with and without the presence of an oxygen-reactive enzyme.

FIGS. 2 and 3 are respectively graphs of cell population versus time which record the comparative growth results with *L. bulgaricus* and *S. thermophilus* with and without the presence of OXYRASE™ enzyme suspension in the growth media.

In the case of FIG. 2, the lower growth curve E represents the no-OXYRASE™ control, whereas the upper curve F represents the OXYRASE™ suspension-added system. The average growth rate and generation time for the no-OXYRASE™ control was 0.33 CFU/hr and 128.7 minutes; for the OXYRASE™ suspension-added system, the growth rate was 0.40 CFU/hr with a generation time of 100 minutes. Lag duration period was 3.8 hr in the control and 2.4 hr in the OXYRASE™ system. Maximum population was 7.2 log CFU/ml at 46 hr in the control and 7.9 log CFU/ml at 39.3 hr in the OXYRASE™ system. The difference of pH of media before and after was 2.42 in the case of the control, and 2.50 in the OXYRASE™ system. A significant growth stimulation effect was therefore present.

FIG. 3 sets forth the growth results in the case of *S. thermophilus* wherein the lower curve G represents the no-OXYRASE™ control and the upper curve H represents the OXYRASE™ suspension-added system. In the case of the control, the average growth rate with viable cell count was 0.76 CFU/hr with a generation time of 66.4 minutes; the corresponding data for the OXYRASE™ system was 1.23 CFU/hr and 35.1 minutes. Lag duration period was 3.5 hr in the control and 2.5 hr in the OXYRASE™ system. Maximum population was 8.1 log CFU/ml at 39.3 hr in the control, and 8.8 log CFU/ml at 36.7 hr in the OXYRASE™ system. The difference in pH of media before and after the test was 2.61 for the control and 2.71 for the OXYRASE™ System. Again, a significant stimulatory effect was observed in the OXYRASE™ system.

EXAMPLE 3

Figure 7:
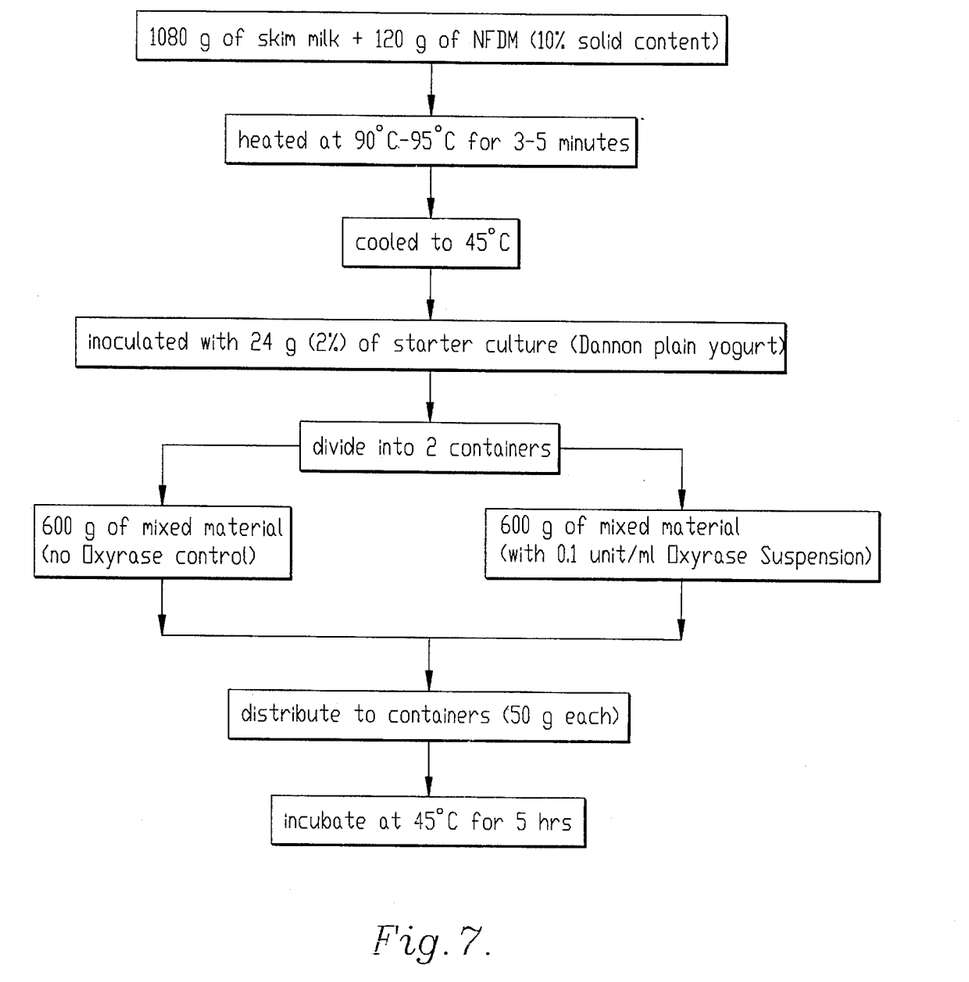
FIG. 7 is a yogurt test flow diagram describing the comparative production of yogurt samples.

In this test, the effect of OXYRASE™ on package-fermented set yogurt was studied. FIG. 7 depicts the production of the comparative yogurt samples. The skim milk was obtained from the Kansas State University Dairy Plant, whereas the non-fat dry milk (NFDM) and Dannon Plain Yogurt were commercially obtained. All containers were autoclaved before the test. Mixing of skim milk and NFDM was carried out in 2 liter Erlenmyer flasks. All mixtures were hand shaken for 3 minutes. Viable cell count, titratable acidity and pH were measured at 0, 1, 2, 3, 4 and 5 hours. Viable cell count was determined on MRS broth agar with spread method, the acidity was measured by titration method (Marth, 1978, Standard Methods for the Examination of Dairy Products; *American Public Health Assoc,. Inc.,* pp. 169–186, 355–357) and pH was measured by a Beckman pH meter. At 0 and 5 hr, viscosity, ratio of rods to cocci, and flavor were estimated. Viscosity was measured by UK RV 8 rotating disc (Viscometers UK Limited, London). Samples were measured with 50 RPM at 0 hr and with 20 RPM at 5 hr. For the ratio of rods to cocci, a direct microscopic method which also evaluated total number was used (Marth, 1978, Standard Methods for the Examination of Dairy Products; *American Public Health Assoc., Inc.,* pp. 169–186, 355–357). Acid aroma was evaluated by an untrained 5 member panel with numerical score (1: very weak, 2: weak, 3: fair, 4: strong, 5: very strong). All experiments were replicated 5 times.

The effect of OXYRASE™ on yogurt fermentation is shown in Table 1. During the 5 hour fermentation study the data showed that in the presence of OXYRASE™, the pH dropped faster, total acid increased more, and viable cell count also increased faster as compared with control. A higher number of cells (direct count) were counted for samples with OXYRASE™ as compared with the control. The ratio of cocci to rods was about 5:1 at the beginning but shifted to 4.1:1 for the control and 3.4:1 for the OXYRASE™ sample. Thus it is deduced that Lactobacillus grows better than Streptococcus in the presence of OXYRASE™. The flavor of yogurt was found to be more acidic due to the formation higher percent of total acids. The yogurt with OXYRASE™ was less viscous than the control. If pH 4.4 is used as a criterion of termination of yogurt fermentation (Kosikowski, 1977, *Cheese and Fermented Foods,* 2nd Ed., Edwards Brothers, Inc., Ann Arbor, Mich.), then OXYRASE™ as an advantage of completing the fermentation about 2 hours earlier than the control.

| Treatment | Time (Hr) | pH | Total Acid (%) | CP | DC | Ratio | Flavor | Viscos |
|---|---|---|---|---|---|---|---|---|
| Control | 0 | 6.36 | 0.32 | 5.79 | 6.51 | 5.4:1 | 1.0 | 14.7 |
| | 1 | 6.15 | 0.40 | 6.28 | | | | |
| | 2 | 5.61 | 0.57 | 7.02 | | | | |
| | 3 | 4.95 | 0.97 | 7.40 | | | | |
| | 4 | 4.68 | 1.19 | 7.69 | | | | |
| | 5 | 4.45 | 1.35 | 7.57 | 8.05 | 4.1:1 | 3.0 | 3898.0 |
| Oxyrase ™ | 0 | 6.34 | 0.33 | 5.66 | 6.48 | 4.9:1 | 1.0 | 14.7 |
| | 1 | 6.07 | 0.44 | 6.54 | | | | |
| | 2 | 5.47 | 0.66 | 7.29 | | | | |
| | 3 | 4.85 | 1.21 | 7.68 | | | | |
| | 4 | 5.39 | 1.37 | 8.01 | | | | |
| | 5 | 4.20 | 1.65 | 7.57 | 8.58 | 3.4:1 | 3.7 | 2677.3 |

Figure 4:
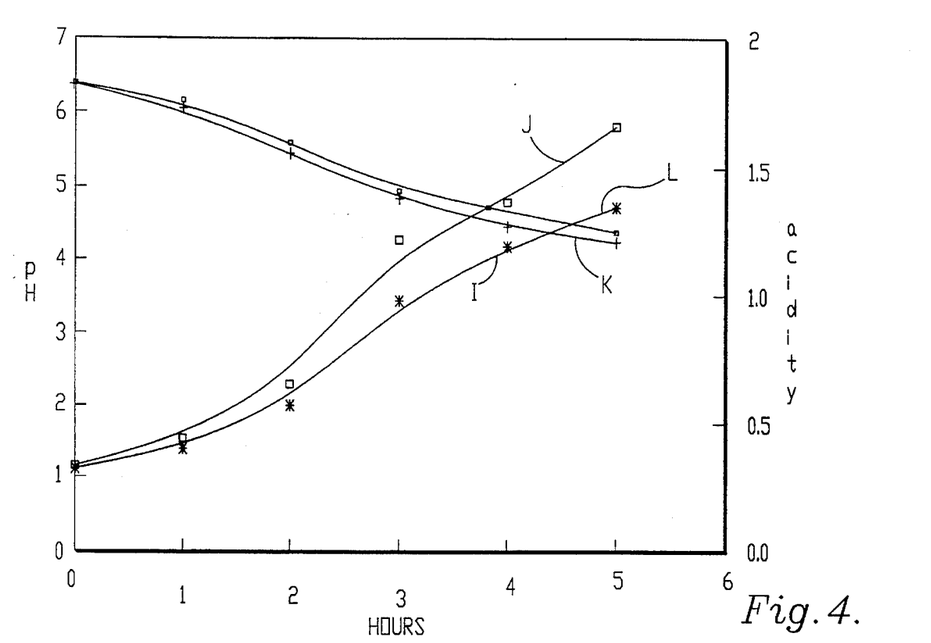
FIG. 4 is graph depicting comparative pH and acidity changes over time in the fermentation of yogurt, with and without use of an oxygen-reactive enzyme.

CP: Cell Population (log CPU/ml)
DC: Direct Cell Count (log N/ml)
RATIO: cocci to rods
FLAVOR: acid flavor
VISCOS: Viscosity in centipoise FIG. 4 depicts the change of pH and acidity over time with and without OXYRASE™, where curves I and K represent the control, and curves J and L represent the corresponding OXYRASE™ samples. Decrease of pH and increase of acidity with OXYRASE™ were faster than without OXYRASE™.

The above results are believed to be due to the symbiotic behavior of yogurt starter culture in the presence of OXYRASE™ enzyme. With the enzyme, a larger population of starter culture caused higher acidity, and this in turn caused a more developed acidic flavor. The change in the cocci to rods ratio was caused by different growth rates of *S. thermophilus* and *L. bulgaricus* in the media. *L. bulgaricus* produces amino acids that stimulate the growth of *S. thermophilus* (Fung et al., 1988, Mixed Culture Interactions in Anaerobic Fermentations, *Handbook on Anaerobic Fermentations*, Marcel Dekker, Inc., N.Y.). Under anaerobic conditions, *S. thermophilus* produces a stimulatory factor for *L. bulgaricus* by producing formic acid (Tamine et al., 1980, *Yogurt Technology and Biochemistry*, J. Food Prot., 43(13):937–939). In the presence of OXYRASE™, the cocci to rod ration was shifted to favor rods, and higher acidity was produced.

The viscosity of yogurt is almost wholly dependent upon the protein content of the yogurt, but may also be affected by homogenization and temperature. In this test, the latter conditions were held constant; it could therefore be inferred that the relative proportion of the cocci and rod populations influenced yogurt viscosity.

In considering the results of Examples 2 and 3, it is clear that OXYRASE™ stimulated cell growth, and that the degree of acceleration was related to the concentration of OXYRASE™ and initial culture population. When the initial population was low, the effect of OXYRASE™ was more pronounced, as compared with a higher initial concentration of cells. The difference in growth between controls and the OXYRASE™ samples was significant ($p<0.01$).

EXAMPLE 4

In this test, the rate of fermentation of buttermilk was tested to determine the effect of OXYRASE™.

Six milk bottles were first obtained and thoroughly cleaned. Each bottle was labeled for a particular type of milk (skim milk, 2–3% fat milk, and whole milk). Using the conventional Pearson square formula, the amount of NFDM to be added to the skim and 2% milk to obtain a 300 ml mixture having 12% solids not fat (snf) was calculated. No solids were added to the whole milk.

The correct amount of milk and NFDM were measured and mixed into the appropriate bottles. All six bottles were heated to 85°–88° C. for 30 minutes to destroy many bacteria, inactivate the natural inhibitors of lactic cultures which are present in the milk, and to bind sufficient water to the milk proteins so to minimize the incidence of "wheying off." All bottles were then cooled to 24° C. and inoculated with 2% commercially available lactic acid bacteria buttermilk starter culture (Steffen, Wichita, Kans.), and mixed well. One bottle of each whole, 2% and skim milk was also inoculated with 1 ml of OXYRASE™ suspension and mixed well. The bottles were then kept in a quiescent state in a 24° C. water bath.

Titratable acidity and pH were recorded at the beginning of the test and each hour thereafter until acidity reached 0.85% or the pH reached 4.50. Titratable acidity tests were run in accordance with the protocols specified in the *Standard Methods for the Examination of Dairy Products*, 5th Ed. Once the acidity reached 0.85% or the pH reached 4.50, the buttermilk was immediately cooled to 4°–8° C. and stored in the refrigerator.

Figure 5:
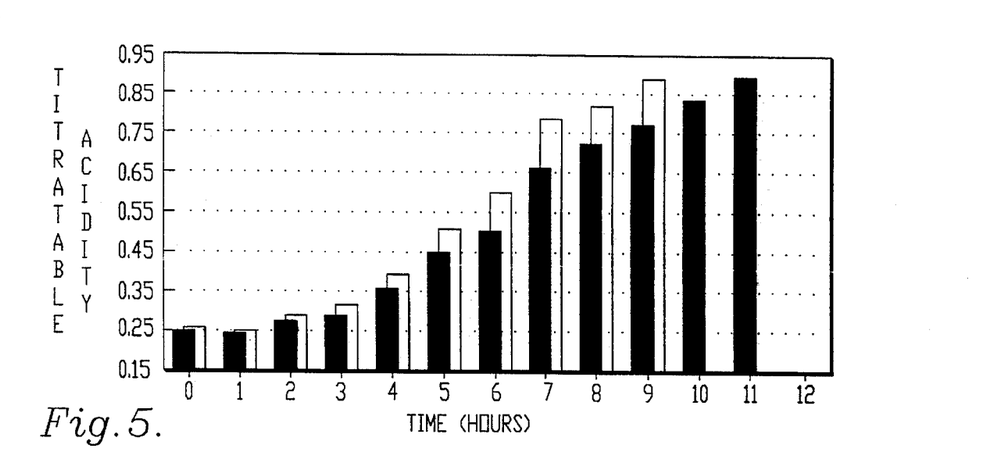
FIG. 5 is a comparative bar graph illustrating the titratable acidity over time of respective buttermilk cultures with and without use of an oxygen-reactive enzyme.

FIG. 5 is a graphical representation of the titratable acidity results obtained in this test, wherein the solid black bars represent the acidity of the 2% control milk without OXYRASE™, and the blank bars represent the acidity of the 2% milk inoculated with OXYRASE™. The presence of OXYRASE caused faster development of acidity as compared with the control, thus establishing that buttermilk may be fermented faster through the use of OXYRASE™ addition.

EXAMPLE 5

In this test, the effect of OXYRASE™ on the fermentation of dry-cured hard salami was investigated. The following table sets forth the ingredients of the standard salami product:

| Ingredients: | |
|---|---|
| Beef | 10.0 lbs |
| Salt | 159.6 g |

-continued

| Ingredients: | |
|---|---|
| Powdered dextrose | 28.5 g |
| Prague powder No. 2 | 11.4 g |
| Ground white pepper | 11.4 g |
| Ginger | 2.9 g |
| Garlic powder | 2.9 g |
| Corn syrup solids | 57.0 g |
| Lactocel 75 (Starter Culture) | 1.9 g |

The beef (Kansas State University Meat Laboratory) was ground by successively passing it through a ½" and ⅛" grinder plates. The meat was then placed in a Hobart mixer with the salt, mixed for 2 minutes and then allowed to stand for 5 minutes. All of the other seasonings were then mixed together and added to the meat with mixing for 1 minute. The Prague powder solution was then added with an additional 1 minute mixing. The Lactocel 75 starter culture is a commercially available lactic acid culture believed to contain *Pediococcus cerevisiae* bacteria, and this was dissolved in water (60°–90 F.), added to the meat and mixed for 1 minute. The sausage mixture was then split into two 5 pound portions, and one portion was inoculated with 4 ml/lb of OXYRASE™ enzyme suspension, with mixing. The respective control and OXYRASE™ suspension-added portions were then stuffed into No. 6 fibrous, pre-stuck, easy-peel casings (Viskase Corp., Chicago, Ill.). The casings were then clipped using a polyclip pressure deice (Nierdecker GmBH, Germany) and the product was fermented at 90° F. until the pH dropped to $\leq 4.8$. The product was then smoked in a smokehouse according to standard procedures. The smoked salami was then stored at 50°–60° F. with a relative humidity of 70–72%. The salami was withdrawn when it lost 25–30% of its green weight.

Figure 6:
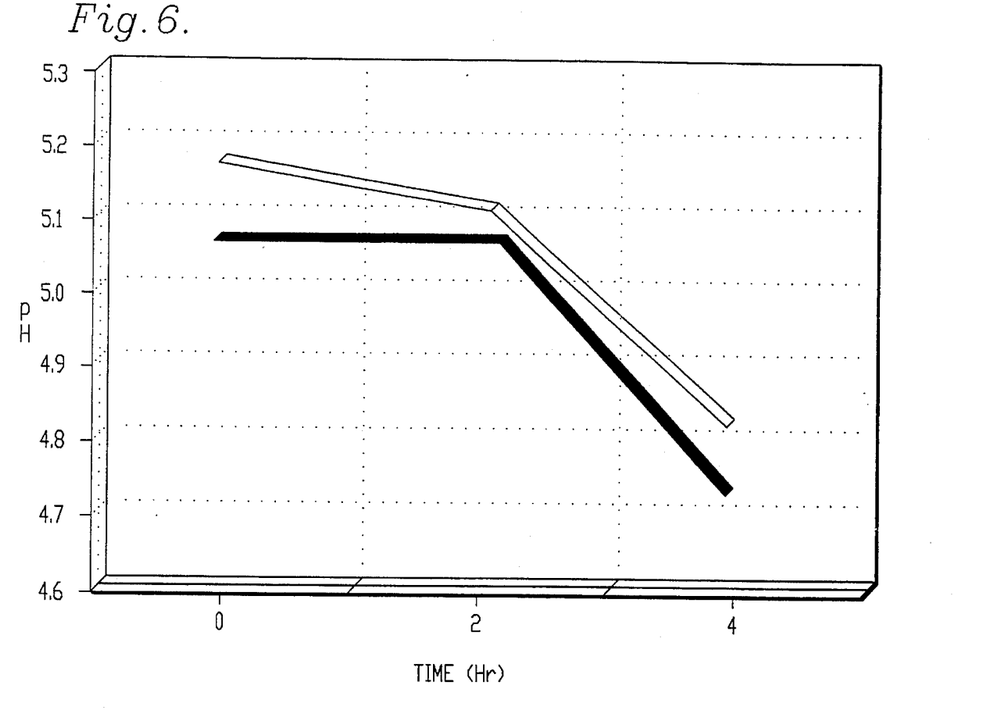
FIG. 6 is a comparative graph of pH versus time for the fermentation of dry-cured hard salami with and without the use of an oxygen-reactive enzyme.

FIG. 6 sets forth the pH versus time data developed in this test. The black bar plot represents the data obtained using the OXYRASE™ suspension-added sausage, whereas the upper, open bar plot represents the data obtained with the control, no-OXYRASE™ sausage. This test confirmed that the presence of OXYRASE™ causes faster development of acid in the sausage, indicating that the sausage fermentation can be completed in a significantly faster period of time when OXYRASE™ is used.

Those skilled in the art will appreciate that the principles of the present invention can be employed in conjunction with a wide variety of fermentative microorganisms. A representative listing of such microorganisms would include: Arthrobacter, *Arthrobacter paraffineus*, *Arthrobacter simplex*, Azotobacter, Bordetella, Brevibacterium, Brevibacterium ammonia-genes, *Brevibacterium divaricatum*, *Brevibacterium flavum*, *Brevibacterium imperiale*, *Brevibacterium lactofermentum*, *Brevibacterium liquifaciens*, *Butyribacterium rettgeri*, Candida, *Candida boidinii*, *Candida flareri*, *Candida lipolytica*, *Candida oleophila*, *Candida parapsilosis*, *Candida periculosa*, *Candida tropicalis*, *Candida utilis*, Clostridum, *Clostridium acetobutylicum*, *Clostridium thermocellum*, *Clostridium thermosaccharolyticum*, Corynebacterium, *Corynebacterium alkanolyticum*, *Corynebacterium glutamicum*, *Corynebacterium guanofaciens*, *Corynebacterium hydrocarboclastus*, *Corynebacterium petrophilum*, *Corynebacterium simplex*, *Cryptococcus laurentii*, Erwinia, *Erwinia aroideae*, *Erwinia carotovora*, *Erwinia herbicola*, Escherichia, *Escherichia coli*, *Escherichia freudii*, Flavobacterium, *Flavobacterium aminogenes*, *Hansenula anomala*, *Hansenula capsulata*, *Hansenula henricii*, *Hansenula minuta*, *Hansenula nonfermentans*, *Hansenula polymorpha*, *Hansenula wickerhamii*, Hydrogenomonas, Klebsiella, *Klebsiella aerogenes*, *Klebsiella pneumoniae*, Kloekera, *Kluyvera citrophila*, *Kluyveromyces fragilis*, *Kluyveromyces lactis*, Lactobacillaceae, Lactobacillus, *Lactobacillus bulgaricus*, *Lactobacillus delbrueckii*, *Lactobacillus helviticus*, *Lactobacillus pentosus*, *Leuconostoc brevis*, *Leuconostoc dextranicum*, *Leuconostoc mesenteroides*, *Methanobacillus omelianski*, *Methanobacterium soehngenii*, *Methanomonas margaritae*, Methylobacter, Methylococcus, *Methylococcus capsulatus*, Methylocytis, Methylomonas, Methylosinus, *Methylovibrio soehngenii*, Microbacterium, *Microbacterium ammoniaphilum*, *Microbacterium smegmatis*, Neurospora, *Neurospora crassa*, *Neurospora sitophila*, Nocardia, *Nocardia alkanoglutinosa*, *Nocardia asteroides*, Nocardiaceae, *Nocardia dassonvillei*, *Nocardia erythropolis*, *Nocardia gardneri*, *Nocardia mediterranei*, *Nocardia opaca*, *Nocardia rhodochrous*, *Nocardia uniformis*, Propionibacterium, *Propionibacterium freudenreichii*, *Propionibacterium shermanii*, Proteus, *Proteus rettgeri*, Rhizobium, Saccharomyces, *Saccharomyces carlsbergensis*, *Saccharomyces cerevisiae*, *Saccharomyces diasticus*, *Saccharomyces fibuliera*, *Saccharomyces lipolytica*, *Saccharomyces rouxii*, *Saccharopolyspora hirsuta*, *Sarcina lutea*, Serratia, *Serratia marcescens*, Streptococcus, *Streptococcus cremoris*, *Streptococcus diacetilactis*, *Streptococcus lactis*, *Streptococcus mutans*, *Streptococcus thermophilus*, Streptomycetaceae, Streptomyces, *Streptomyces achromogenes*, *Streptomyces acrimycini*, *Streptomyces alboflavus*, *Streptomyces albogriseolus*, *Streptomyces alboniger*, *Streptomyces albus*, *Streptomyces alcalophilus*, *Streptomyces ambofaciens*, *Streptomyces antibioticus*, *Streptomyces argenteolus*, *Streptomyces argillaceus*, *Streptomyces atroolivaceus*, *Streptomyces aureofaciens*, *Streptomyces aureus*, *Streptomyces azureus*, *Streptomyces bambergiensis*, *Streptomyces bikiniensis*, *Streptomyces bluensis*, *Streptomyces cacaoi*, *Streptomyces caespitosus*, *Streptomyces californicus*, *Streptomyces canus*, *Streptomyces capreolus*, *Streptomyces carzinostaticus*, *Streptomyces cattleya*, *Streptomyces cellulosae*, *Streptomyces chrestomyceticus*, *Streptomyces chrysomallus*, *Streptomyces cinnamonensis*, *Streptomyces clavuligerus*, *Streptomyces coelicolor*, *Streptomyces curacoi*, *Streptomyces ederensis*, *Streptomyces erythreus*, *Streptomyces feofaciens*, *Streptomyces filipinensis*, *Streptomyces flaveolus*, *Streptomyces flavopersicus*, *Streptomyces flavus*, *Streptomyces floridae*, *Streptomyces fradiae*, *Streptomyces fulvissimus*, *Streptomyces fungicidicus*, *Streptomyces garyphalus*, *Streptomyces geysiriensis*, *Streptomyces ghanaensis*, *Streptomyces glaucescens*, *Streptomyces griseochromogenes*, *Streptomyces griseoflavus*, *Streptomyces griseoruber*, *Streptomyces griseus*, *Streptomyces hachijoensis*, *Streptomyces halstedii*, *Streptomyces hofunensis*, *Streptomyces humidus*, *Streptomyces hygroscopicus*, *Streptomyces kagawaensis*, *Streptomyces kanamyceticus*, *Streptomyces kasugaensis*, *Streptomyces kitasatoensis*, *Streptomyces lactamdurans*, *Streptomyces lasaliensis*, *Streptomyces lavendulae*, *Streptomyces levoris*, *Streptomyces lincolnensis*, *Streptomyces lipmanii*, *Streptomyces lividans*, *Streptomyces lividus*, *Streptomyces lusitanus*, *Streptomyces michiganensis*, *Streptomyces mitakaensis*, *Streptomyces narbonensis*, *Streptomyces natalensis*, *Streptomyces netropsis*, *Streptomyces niveus*, *Streptomyces nodosus*, *Streptomyces nojiriensis*, *Streptomyces joursei*, *Streptomyces olivaceus*, *Streptomyces olivochromogenes*, *Streptomyces olivoreticuli*, *Streptomyces omiyaensis*, *Streptomyces orchidaceus*, *Streptomyces orientalis*, *Streptomyces parvulus*, *Streptomyces parvus*, *Streptomyces peucetius*, *Streptomyces phaeochromogenes*, *Streptomyces pilosus*, *Streptomyces platensis*, *Streptomyces plicatus*, *Streptomyces*

*primprina, Streptomyces psammoticus, Streptomyces ramocissimus, Streptomyces rectus, Streptomyces reseochromogenes, Streptomyces reticuli, Streptomyces ribosidificus, Streptomyces rimofaciens, Streptomyces rimosus, Streptomyces roseochromogenes, Streptomyces sannanensis, Streptomyces sayamaensis, Streptomyces scabies, Streptomyces sioyaensis, Streptomyces spectabilis, Streptomyces spheroides, Streptomyces tateyamensis, Streptomyces tenebrarius, Streptomyces testaceus, Streptomyces vendargensis, Streptomyces venezuelae, Streptomyces verticillus, Streptomyces virginiae, Streptomyces viridifaciens, Streptomyces viridochromogenes, Streptomyces viridofaciens, Streptomyces viridoflavus, Streptomyces werraensis, Streptomyces yokosukanensis, Sulfolobus acidocaldarius, Thiobacillus concretivorus, Thiobacillus ferrooxidans, Thiobacillus thermophilicia, Thiobacillus thiooxidans, Torula cremoris, Torulopsis, Torulopsis glabrata, Torulopsis magnoliae, Torulopsis memodendra, Torulopsis methanolovescens, Torulopsis methanosorbosa, Torulopsis molischiana,* and *Torulopsis utilis.*

I claim:

1. In a process for the fermentation of a food ingredient substrate to produce a comestible product, including the steps of inoculating said food ingredient substrate with a fermentative microorganism, and incubating the inoculated food ingredient substrate to cause said microorganism to undergo fermentative activity in the presence of the food ingredient substrate to yield said product, the improvement which comprises the step of contacting said food ingredient substrate with an oxygen-reactive enzyme which is not naturally generated by virtue of said fermentation process, for significantly increasing the fermentative activity of said microorganism, as compared with an otherwise identical process free of said added enzyme.

2. The process of claim 1, said enzyme being present at a level of from about 0.1–0.3 units of enzyme per ml of said substrate.

3. The process of claim 1, said food ingredient substrate being selected from the group consisting of starting food ingredients for the production of fermented liquid, semisolid and solid dairy products, fermented meat products, fermented cereal-based products, yeast-raised baked and fried products, and alcoholic beverages.

4. The process of claim 3, said food ingredient substrate being selected from the group consisting of starting food ingredients for the production of sour cream, yogurt, cheese, buttermilk, bread products, sausage products, wine, beer and distilled fermented alcoholic beverages.

5. The process of claim 1, said fermentative microorganism being selected from the group consisting of bacteria, yeast and molds.

6. The process of claim 5, said microorganism being selected from the group consisting of bacteria from the genera Acetobacter, Streptococcus, Leuconostoc, Pediococcus, Lactobacillus, Propionibacterium, yeast from the genera Saccharomyces, Candida, and Torula, and mold from the genera Aspergillus, Penicillium, Rhizopus, and Mucor.

7. The process of claim 1, including the step of terminating said incubation at a time which is at least about 10% less than the time required to complete the incubation of otherwise identical inoculated food ingredients free of said added enzyme.

8. The process of claim 1, wherein only a single fermentative microorganism is present during said fermentation process.

9. The process of claim 1, wherein a mixture of different microorganisms are present during said fermentation process.

10. The process of claim 1, said microorganism being selected from the group consisting of microorganisms yielding lactic acid fermentation, propionic acid fermentation, citric acid fermentation, alcoholic fermentation, butyric acid fermentation, gassy fermentation, and acetic acid fermentation.

* * * * *